United States Patent [19]

McCulloch

[11] 4,169,665
[45] Oct. 2, 1979

[54] EYEGLASS BOW CONSTRUCTION

[76] Inventor: John R. McCulloch, 753 Cindy La., Petaluma, Calif. 94952

[21] Appl. No.: 824,628

[22] Filed: Aug. 15, 1977

[51] Int. Cl.² .............................................. G02C 5/14
[52] U.S. Cl. ..................................... 351/123; 351/111
[58] Field of Search ........................ 351/123, 120, 111

[56] References Cited

U.S. PATENT DOCUMENTS

| | | | |
|---|---|---|---|
| 375,964 | 1/1888 | Tryner | 351/111 |
| 756,871 | 4/1904 | Marshutz | 351/123 |
| 771,067 | 9/1904 | Heeren | 351/90 |
| 959,105 | 5/1910 | Barnes | 351/123 |
| 962,549 | 6/1910 | Broome | 351/116 |
| 1,157,373 | 10/1915 | Faber | 351/114 |
| 1,243,466 | 10/1917 | Weigel | 351/123 |
| 1,472,014 | 10/1923 | Clulee | 351/119 |
| 1,533,190 | 4/1925 | Jirasek | 351/123 |
| 1,636,740 | 7/1927 | Hickey | 351/123 |
| 1,701,009 | 2/1929 | Nerney | 351/114 |
| 3,000,462 | 9/1961 | Smith | 351/123 |
| 3,010,365 | 11/1961 | Sadel | 351/111 |
| 3,018,687 | 1/1962 | Sadel | 351/118 |
| 3,741,635 | 6/1973 | Wortman | 351/123 |

Primary Examiner—John K. Corbin
Assistant Examiner—Rodney Bovernick
Attorney, Agent, or Firm—Phillips, Moore, Weissenberger, Lempio & Majestic

[57] ABSTRACT

An eyeglass temple has an ear engaging end portion arranged to fit within the cymba concha and includes load bearing points for engaging the underside of the crus antihelicus and the upper surface of the crus helicus for preventing downward rotation of the eyeglass about the ear, or forward motion of the eyeglasses.

12 Claims, 8 Drawing Figures

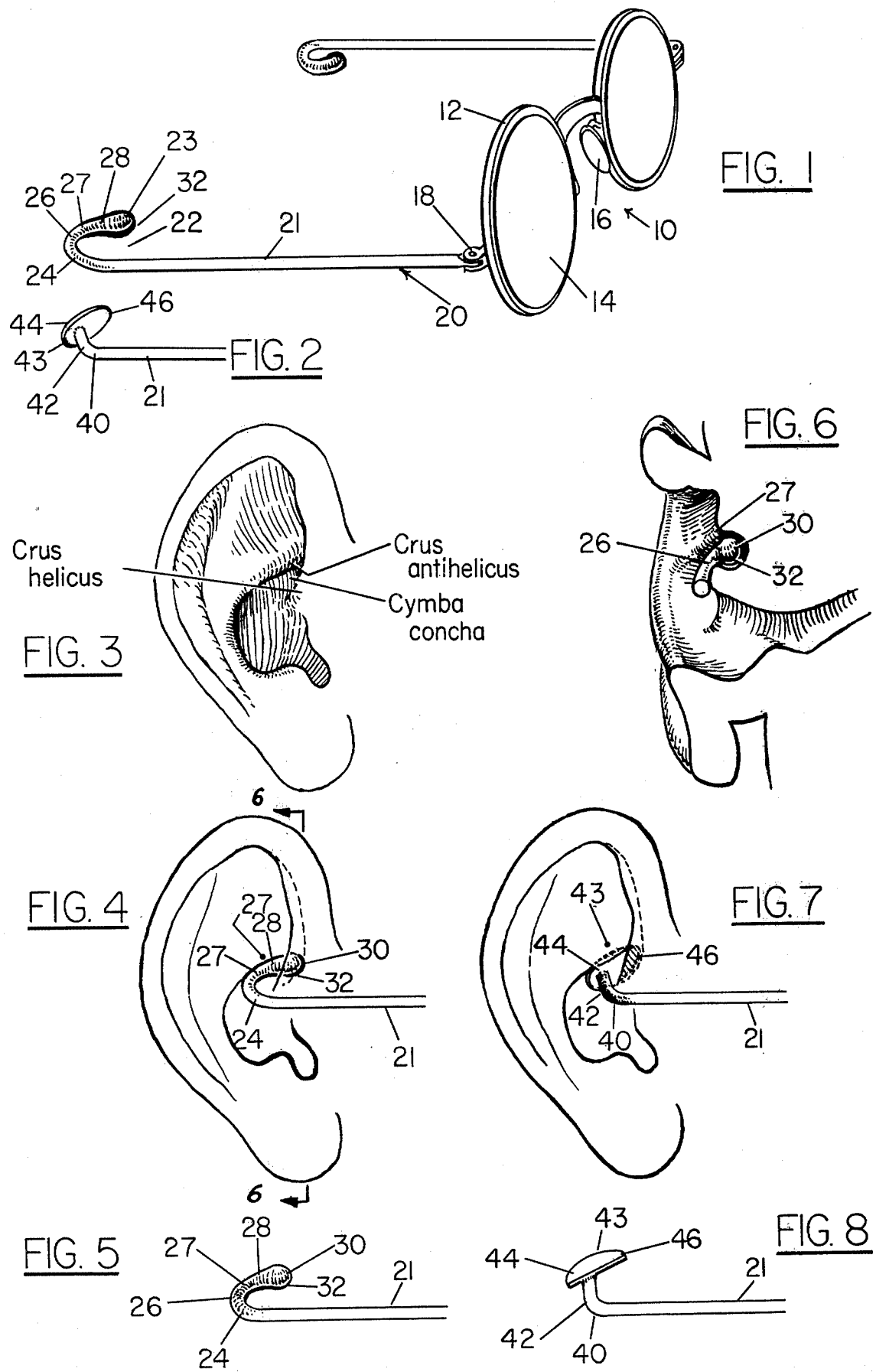

EYEGLASS BOW CONSTRUCTION

BACKGROUND OF THE INVENTION

This invention relates to eyeglass temple or bow construction and more particularly to the manner in which they engage the wearer's ear.

The most common form of eyeglass bow construction consists of two bows connected on either side of a front frame portion which supports the lenses and rests upon the wearer's nose bridge. The bows extend backwardly from the front frame to a length extending slightly beyond the ear, press against wearer's temples and rest upon wearer's ear-to-temple junction. Such bows terminate in a straight portion above and behind the ear, or in a curved portion that curves down behind the wearer's ear to varying degrees. Although quite popular, these present eyeglass bow constructions require a pressure engagement of the temple area, or a firm "hooking" behind the wearer's ear, both of which can be quite uncomfortable, and they nevertheless permit substantial eyeglass slippage on the inclined plane of the nose.

Other prior art constructions have provided a bow that terminates in a short bend terminating in large balls that fit into the front rims of the ears near their lower ends. Another design has incorporated a similar short bend terminating in a curved portion that fits behind the upper front portion of the ear. Such designs prevent forward linear motion of the bows and lens frames as the frames tend to slide down the nose. However due to the significantly greater weight of the lenses and frames compared to the bows, and the steep incline of many nose bridges, a major factor that tends to dislodge eyeglasses from their proper position is not forward linear motion of the glasses, but rather downward rotation of the lens frames and bows about an axis where the distal ends of the bows engage the ears. None of the prior art devices have been designed to resist this rotation about the ear.

SUMMARY OF THE INVENTION

Accordingly it is an object of the present invention to provide an eyeglass bow construction that prevents slippage from the proper position through both linear forward displacement, and also downward rotation of the frames about the ear. This is achieved by the device of the present invention which provides a bow construction that includes an ear engaging portion having spaced upward and downward load bearing points arranged to engage two points on the ear to resist any moment caused by the tendency of the lens frames to rotate downwardly, and which also locks the bows and frames against any forward linear motion. This end portion having the described bearing points is provided in the first embodiment by a complex bend of the end of the bow, and in a second embodiment by a solid molded portion, which may be custom molded, and which incorporates the required load bearing points.

DESCRIPTION OF THE DRAWINGS

In the Drawings:

FIG. 1 is a perspective view of eyeglasses embodying the present invention,

FIG. 2 is a perspective view of an alternative embodiment of the present invention, FIG. 3 is a view of a typical ear, FIG. 4 is a view of an ear engaged by the bow construction of the present invention, FIG. 5 is a plan view of the end portion of the bow shown in FIG. 1, FIG. 6 is a sectional view taken along the line and in the direction indicated by the arrows 6—6 in FIG. 4, FIG. 7 is a view of an ear engaged by the bow construction shown in FIG. 2, and FIG. 8 is a plan view of the end portion of the bow shown in FIG. 2.

DESCRIPTION OF THE PREFERRED EMBODIMENT

Referring to FIG. 1, eyeglasses embodying the present invention are shown generally at 10 and comprise lens frames 12 mounting lenses 14 therein and having nose bridge engaging means 16 which may be integral with the frames or separate pad members mounted thereon. Mounted on the outer edges of the frames are hinge means 18 having bows 20 hingedly attached thereto.

The bows extend rearwardly of the frames in spaced parallel relationship and include intermediate portions 21, and distal end portions 22 having ear engaging means indicated generally at 23 provided thereon.

The ear engaging portion of the bow comprises a first curved portion 24 forming obtuse bend and angled inwardly of the vertical plane passing through the intermediate portions of bow and a second curved portion 26 which comprises a bend of approximately 180° with intermediate portion 21 whereby an upper point of the bend will be substantially inwardly thereof and will form a load bearing point 27. A short segment 28 is joined to said curved portion and extends forwardly of the curved portion and terminates in a rounded end portion 30 which includes a second load bearing point 32.

As shown in FIG. 4, the first curved portion 24 is arranged to curve upwardly and inwardly whereby it will project into the cymba concha so that the load bearing point 27 at the upper extent of this curved portion bears lightly upon the under surface of the crus antihelicus. Short segment 28 then extends forwardly toward the crus helicus where the second load bearing point 32 on a rounded end portion 30 lightly bears against the upper inner surface thereof.

When the eyeglass frames tend to rotate downwardly about the ear, the moment in the intermediate portions of the bows will be reflected in the short segments 28 of the end portions. Thus a reactive force will be applied to the first bearing point 27 on the bow by the under surface of the crus antihelicus, and a reactive force will be applied to the second load bearing bearing point 32 by the upper surface of the crus helicus, whereby a moment will be imparted to the frames through the end portions of the bows equal to the moment of the center of gravity of the frames about the ear. The rounded end portion 30 and the second load bearing point 32 thereon will also be restrained against linear forward movement by the crus helicus and thus the bows and the frames secured thereto are retained against both forward motion and downward rotation.

The angle of the first and second curved portions as seen in the plan view thereof, and the angle of short segment 28 with respect to mid portion 21 as projected on a vertical plane can be slightly less than 180° to slightly greater than 180°, the upper limit being the angle of the crus antihelicus. The lower limit will be when the short segment is normal to the crus helicus. However, to minimize forces on the ear for greater comfort, it is desirable that the distance between the load bearing points, and the length of short segment 28, be as long as possible.

It will be appreciated that in view of the angle of the crus helicus with respect to the crus antihelicus, adjustment for fitting individual ears can be made by varying this angle slightly by bending the second curved portion during final fitting whereby the crus antihelicus and the crus helicus are lightly engaged. The first and second load bearing points are formed by the point of contact of the curved outer profile of the second and third curved portions with the crus antihelicus and crus helicus respectively. Thus as the angle of the second curved portion and short segment 28 is adjusted, the first and second load bearing points will be maintained as the points of contact move along the profiles of the curved portion.

A second embodiment of this invention is shown in FIG. 2 wherein the distal ends of the bows include an obtuse bend 40 and a segment 42 joined thereto that by virtue of said bend extends upward and inward of the intermediate portion 21 of the bow, into the interior of the cymba concha of the outer ear. A molded wedge 43, preferably of plastic, is mounted on the end of segment 42 and is shaped to fit within the cymba concha. The general outline of the wedge is not critical but is designed to approximate the configuration of the upper portion of the cymba concha. The wedge does however include an upper load bearing point 44 formed on a curved profile and which is arranged to engage the under surface of the crus antihelicus, and a second load bearing point 46 also formed on a curved profile which is arranged to engage the upper surface of the crus helicus. The function of these two load bearing points and of this embodiment is similar to that of the embodiment previously described above. The intermediate portions of the wedge extending between the load bearing points thereon are preferably rounded and smoothed and may engage extended portions of the crus antihelicus and crus helicus respectively to distribute the forces imposed thereon for greater comfort.

For maximum distribution of such loads, a custom made wedge molded from an impression of the upper portion of the wearer's cymba concha may be provided.

Adjustment of this embodiment for the variations in particular ears can also be made by the fitter by adjusting the angle of bend 40 and the vertical angle of the line extending between the first bearing point and the second bearing point for light engagement of the wearer's crus antihelicus and crus helicus respectively when the frames are properly positioned on the nose bridge.

It will be appreciated from the foregoing description that the present invention, as represented by the two embodiments shown and described, provides an eyeglass bow construction that not only prevents forward linear displacement of the frames as in prior art devices, but also prevents rotation of the frames downward around the contact point of the bows with the ears or temple area, and thus prevents slipping of the frames down the nose bridge.

What is claimed is:

1. Eyeglass bows for eyeglasses having a forward end having attachment means for attachment to a frame, an intermediate portion and a distal end portion, said end portion including first means for engaging a wearer's ear so that downward rotation of the bow will impart a downward reactive force thereto, and second means for engaging a wearer's ear forward of said first means so that downward rotation of the bow will impart an upward reactive force thereto.

2. The eyeglass bows defined in claim 1 wherein said second means being shaped to impart a rearward force on the distal end portion upon forward movement of said end portion.

3. The invention defined in claim 2 wherein said end portion comprises a first curved portion extending upwardly and inwardly of the intermediate portion, a second curved portion comprising a bend of approximately 180°, a short segment joined to said second curved portion and extending forwardly thereof, and a rounded end segment on said short segment.

4. The invention defined in claim 3 wherein said first means comprises a portion of a surface of said second curved portion adapted to engage the under surface of the crus antihelicus of a wearer's ear, and the second means comprises a portion of the rounded end segment adapted to engage the upper surface of the crus helicus of the wearer's ear.

5. The invention defined in claim 2 wherein said end portion comprises an obtuse bend portion joined to said intermediate portion, a segment joined to the bend portion and a flat vertical wedge member mounted on the segment, and wherein said first means comprises a portion of the upper rear surface of said wedge member, and said second means comprises a portion of the lower forward surface of said wedge member.

6. The invention defined in claim 5 wherein said bend portion, segment, and wedge member are arranged whereby the wedge member may be disposed within the cymba concha of a wearer of said eyeglasses with said upper rear surface of the wedge member configured to engage the under surface of the crus antihelicus and the lower forward surface of said wedge member configured to engage the upper surface of the crus helicus.

7. The invention defined in claim 6 wherein the wedge member is in the shape of the cymba concha.

8. A method of fitting eyeglasses having a lens frame and bows extending rearwardly from said frame, to a wearer thereof comprising, arranging the bows to extend rearwardly of the wearer's face alongside the temples to an area outwardly adjacent the midportion of the ear of the wearer, bending the bows whereby they project inwardly and upwardly of the ear, into the cymba concha to a first engagement point on the under surface of the crus antihelicus, bending the remaining portion of the bow whereby it extends forwardly of said first engagement point to a second engagement point on the upper surface of the crus helicus, whereby upon rotation of the frames about the ears of the wearer, reactive forces will be imposed on the first and second engagement points by the crus antihelicus and the crus helicus respectively to provide a moment in the bows which resists said rotation of the frames.

9. A method of fitting eyeglasses having a lens frame, bows including intermediate portions extending rearwardly of the lens frame, bend portions secured to said intermediate portion, segments secured to said bend portions and extending inwardly of the intermediate portions, and wedge members secured to the segments, to a wearer thereof comprising, adjusting said bend portions whereby the wedge member will be disposed within the cymba concha of the wearer's ear, and adjusting the angle of the wedge member with respect to the intermediate portion of the bows whereby an upper rearward portion of the wedge member will engage the under surface of the crus antihelicus of the wearer's ear, and a forward lower portion of the wedge member will engage the upper surface of the crus helicus of the wearer's ear, whereby upon downward rotation of the frames the wearer's crus antihelicus and crus helicus will exert reactive forces on the wedge member resulting in a moment that resists said rotation.

10. An ear engaging end member for an eyeglass bow comprising first means configured to engage the under surface of a crus antihelicus for imparting a downward reactive force to a first portion of said end member upon downward rotation of the bow about said end member, and second means configured to engage an associated crus helicus for imparting an upward reactive force to a second portion of said end member upon downward rotation of the bow about said end member.

11. The end member defined in claim 10 wherein said second means is shaped to impart a rearward reactive force on the end member upon forward movement of the member.

12. The invention defined in claim 10 wherein said member comprises a first end adapted for being aligned with and secured to an eyeglass bow, a first curved portion extending upwardly and inwardly of said first end, a second curved portion, a short segment joined to said second curved portion and extending forwardly of said second curved portion, and a second rounded end secured to said segment, wherein said first means comprises a portion of the upper surface of said second curved portion, and said second means comprises a portion of the surface of said second end.

* * * * *